(12) United States Patent
Ban

(10) Patent No.: US 9,784,196 B2
(45) Date of Patent: Oct. 10, 2017

(54) CONTROLLER

(71) Applicant: DENSO CORPORATION, Kariya, Aichi-pref. (JP)

(72) Inventor: Takao Ban, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/885,241

(22) Filed: Oct. 16, 2015

(65) Prior Publication Data
US 2016/0123255 A1  May 5, 2016

(30) Foreign Application Priority Data

Oct. 31, 2014  (JP) .................................. 2014-222580

(51) Int. Cl.
| | | |
|---|---|---|
| *F02B 33/44* | (2006.01) | |
| *F02D 41/00* | (2006.01) | |
| *F02M 26/06* | (2016.01) | |
| *F02M 35/10* | (2006.01) | |
| *F02B 29/04* | (2006.01) | |

(Continued)

(52) U.S. Cl.
CPC ...... *F02D 41/0065* (2013.01); *F02B 29/0406* (2013.01); *F02D 41/0007* (2013.01); *F02M 26/06* (2016.02); *F02M 26/23* (2016.02); *F02M 26/47* (2016.02); *F02M 26/50* (2016.02); *F02M 35/1038* (2013.01); *F02M 35/10222* (2013.01); *F02M 35/10386* (2013.01); *F02M 35/10393* (2013.01); *F02D 41/18* (2013.01); *F02D 2041/1472* (2013.01); *F02D 2200/0406* (2013.01); *F02D 2200/0414* (2013.01); *F02D 2200/0418* (2013.01); *F02M 26/05* (2016.02); *Y02T 10/144* (2013.01); *Y02T 10/146* (2013.01); *Y02T 10/47* (2013.01)

(58) Field of Classification Search
CPC .. F02D 41/0065; F02D 41/0007; F02N 26/06; F02N 26/47; F02N 26/50; F02M 35/10222; F02M 35/1038
USPC ....................................................... 60/605.2
See application file for complete search history.

(56) References Cited

U.S. PATENT DOCUMENTS 6,817,197 B1 * 11/2004 Padfield .............. F02B 29/0468
                                                                      123/524
2012/0012088 A1    1/2012  Jung
(Continued)

FOREIGN PATENT DOCUMENTS

| JP | 2006-220026 | 8/2006 |
|---|---|---|
| JP | 2012-163061 | 8/2012 |
| JP | 2012163061 A | * 8/2012 |

*Primary Examiner* — Ngoc T Nguyen
(74) *Attorney, Agent, or Firm* — Nixon & Vanderhye PC

(57) ABSTRACT

A controller calculates a specific humidity of an intake air based on a relative humidity of the intake air, an intake air temperature, and an intake air pressure. Then the controller calculates a water vapor amount in the intake air based on the specific humidity and a mass flow rate of the intake air obtained from an air intake rate. By calculating the water vapor amount in the intake air based on information that directly represents the status of the intake air, this water vapor amount may be calculated more accurately. As a result, a generation amount of condensed water may be estimated more accurately. Therefore, accumulation of condensed water may be suppressed while recirculating as much of a low pressure exhaust gas as possible, and thus fuel economy may be sufficiently improved.

3 Claims, 3 Drawing Sheets

(51) Int. Cl.
*F02M 26/50* (2016.01)
*F02M 26/23* (2016.01)
*F02M 26/47* (2016.01)
F02D 41/14 (2006.01)
F02D 41/18 (2006.01)
F02M 26/05 (2016.01)

(56) References Cited

U.S. PATENT DOCUMENTS

| | | | |
|---|---|---|---|
| 2012/0024271 A1* | 2/2012 | Pasero | F02M 26/28 123/568.22 |
| 2013/0238218 A1* | 9/2013 | Wiggins | F02D 41/065 701/102 |
| 2014/0102428 A1* | 4/2014 | Fulton | F02B 29/0468 123/568.12 |

* cited by examiner

CONTROLLER

CROSS REFERENCE TO RELATED APPLICATION

The present application is based on Japanese Patent Application No. 2014-222580 filed on Oct. 31, 2014, disclosure of which is incorporated herein by reference.

TECHNICAL FIELD

The present disclosure relates to a controller for an internal combustion engine.

BACKGROUND

Exhaust gas recirculation (EGR) devices, which recirculate a portion of exhaust gas to an intake passage for an internal combustion engine including a supercharger, are known. Among these EGR devices, a low pressure EGR device uses a cooler to cool a portion of relatively low pressure exhaust gas downstream of a turbine of the supercharger. Then, this low pressure EGR device recirculates the low pressure exhaust gas to the intake passage upstream of a compressor of the supercharger. As such, a large quantity of low temperature exhaust gas may be recirculated.

In internal combustion engines that include a low pressure EGR device, when water vapor in the exhaust gas is cooled by the cooler or the like, condensed water may form. In this case, there is a concern that the condensed water may corrode various devices. In this regard, JP 2012-163061 A describes a controller that estimates an accumulated amount of condensed water in a low pressure EGR passage. If this accumulated amount exceeds a reference amount, the controller decreases the recirculation amount of low pressure exhaust gas, and increases the recirculation amount of high pressure exhaust gas. As a result, accumulation of the condensed water may be suppressed from exceeding the reference amount.

SUMMARY

However, even if the accumulation of condensed water in the EGR passage and such is suppressed, in order to recirculate as much low pressure exhaust gas as possible, it is necessary to accurately estimate the amount of condensed water being generated, i.e., how much the amount of condensed water increases per predetermined time period. For this reason, it is important to accurately calculate the amount of water vapor in the intake air.

In the controller of JP 2012-163061 A, the amount of water vapor in the intake air is estimated based on an open air temperature, an atmospheric pressure, and a temperature and a pressure near an entrance of an intake manifold. As a result, the amount of water vapor in the intake air is calculated with low accuracy. For this reason, there is a concern that the amount of condensed water may be estimated with low accuracy. Accordingly, it is necessary to set the recirculation amount of low pressure exhaust gas on the low side, and fuel economy may not be sufficiently improved.

In view of the above, it is an object of the present disclosure to provide a controller, for an internal combustion engine, that accurately estimates how much condensed water is generated.

In this regard, according to the present disclosure, there is provided a controller for controlling an internal combustion engine which includes a supercharger, a low pressure exhaust gas recirculation device, an air intake rate detector, an intake air temperature detector, and a relative humidity detector, where (i) the low pressure EGR device recirculates exhaust gas from an exhaust passage downstream of a resistive element to an intake passage upstream of a compressor of the supercharger, (ii) the resistive element resists the exhaust gas, (iii) the air intake rate detector detects an air intake rate, (iv) the intake air temperature detector detects an intake air temperature, and (v) the relative humidity detector detects a relative humidity of an intake air. The controller includes a specific humidity calculation unit that calculates a specific humidity of the intake air based on the relative humidity, the intake air temperature, and an intake air pressure of the intake air, and a first vapor amount calculation unit that calculates a water vapor amount in the intake air based on a mass flow rate of the intake air and the specific humidity, the mass flow rate being obtained from the air intake rate By calculating the water vapor amount in the intake air based on information that directly represents the status of the intake air, this water vapor amount may be calculated more accurately. As a result, a generation amount of condensed water may be estimated more accurately. Therefore, accumulation of condensed water may be suppressed while recirculating as much of a low pressure exhaust gas as possible, and thus fuel economy may be sufficiently improved.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Hereinafter, embodiments of the present disclosure will be explained with reference to the figures.

(First Embodiment)

Figure 1:
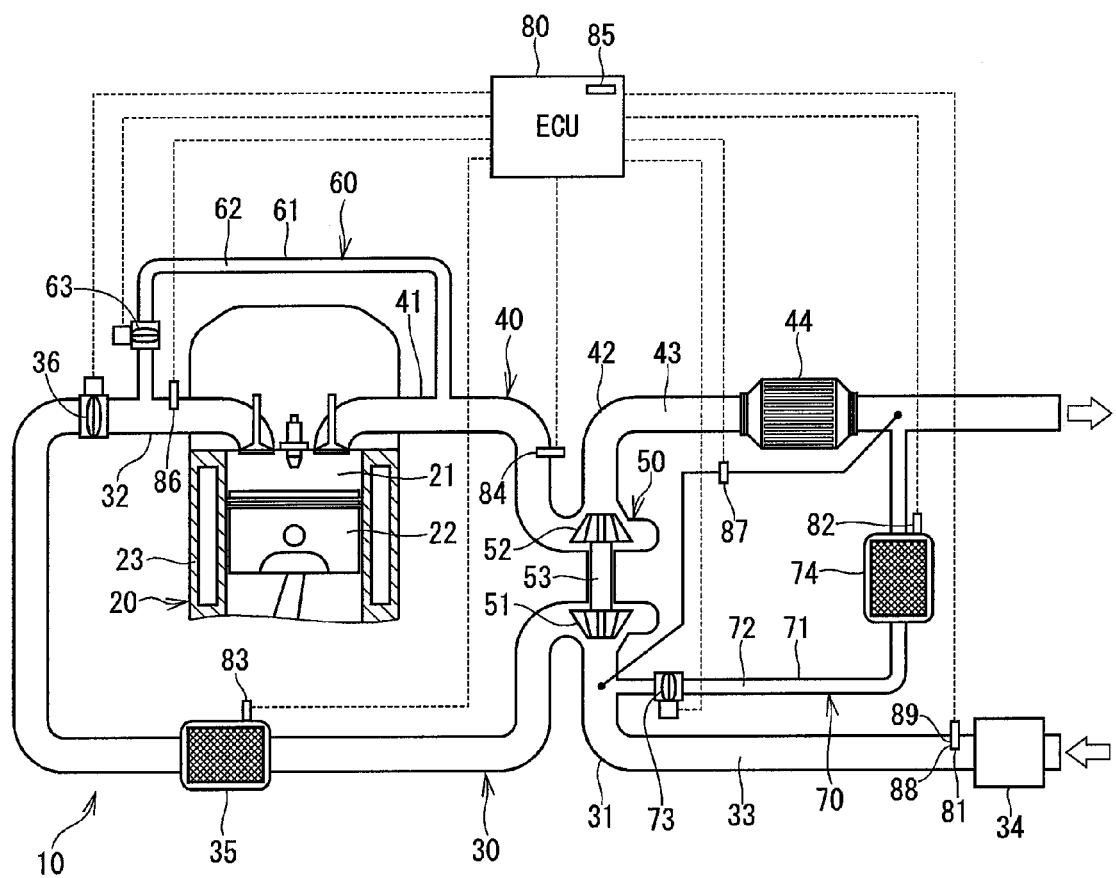
FIG. 1 is a view of an outline configuration of an engine which uses a controller according to an embodiment of the present disclosure.

A controller according to a first embodiment of the present disclosure is applied to an engine shown in FIG. 1.

First, the basic configuration of an engine 10 will be explained with reference to FIG. 1.

As shown in FIG. 1, the engine 10 includes an engine body 20, an intake device 30, an exhaust device 40, a supercharger 50, a high pressure EGR device 60, and a low pressure EGR device 70.

At the engine body 20, a gaseous mixture of air and fuel is combusted in a combustion chamber 21, and the force of this combustion presses down on a piston 22 to cause the piston 22 to reciprocate. The reciprocating movement of the piston 22 is converted into a rotational movement of a crankshaft (not illustrated). Further, the engine body 20 includes a plurality of cylinders 23, but for simplicity, only one cylinder 23 is shown in FIG. 1.

The intake device 30 includes an intake pipe 31, an intake manifold 32, an air cleaner 34, an intercooler 35, and a throttle 36. One end of the intake pipe 31 opens to open air. Further, the other end of the intake pipe 31 is connected to the intake manifold 32, which is in turn connected to the engine body 20. In a downstream direction, the air cleaner 34, the intercooler 35, and the throttle 36 are disposed in this order in an intake passage 33 of the intake pipe 31. Here, the intercooler 35 cools supercharged air which was heated due to compression by a compressor 51 of the supercharger 50. Further, the throttle 36 is a valve that adjusts the amount of intake air to the engine body 20. Thus, the intake device 30 supplies air from open air to the engine body 20.

The exhaust device 40 includes an exhaust manifold 41, an exhaust pipe 42, and an exhaust gas purification unit 44. One end of the exhaust manifold 41 is connected to the engine body 20. The other end of the exhaust manifold 41 is connected to the exhaust pipe 42, which is in turn connected to open air. The exhaust gas purification unit 44 is disposed within an exhaust passage 43 of the exhaust pipe 42. Thus, the exhaust device 40 releases exhaust gas, which is gaseous combusted fuel emitted by the engine body 20, to the open air.

The supercharger 50 includes the compressor 51 and a turbine 52. The compressor 51 is disposed in the intake passage 33 between the air cleaner 34 and the intercooler 35. The turbine 52 is disposed in the exhaust passage 43 upstream of the air purification unit 44. Further, the turbine 52 resists the exhaust gas, and provides a "resistive element" of the present disclosure. The compressor 51 is connected to the turbine 52 by a shaft 53, and synchronously rotates with the turbine 52. Thus, the supercharger 50 uses exhaust gas energy to compress intake air in the intake passage 33, thereby supercharging air to the combustion chamber 21.

The high pressure EGR device 60 includes a high pressure EGR pipe 61 and a high pressure EGR valve 63. The high pressure EGR pipe 61 branches from the exhaust pipe 42 upstream of the turbine 52, and rejoins at the intake pipe 31 downstream of the throttle 36. The high pressure EGR valve 63 is disposed within a high pressure EGR passage 62 of the high pressure EGR pipe 61. The high pressure EGR passage 62 may recirculate a portion of high pressure exhaust gas, which is in the exhaust passage 43 upstream of the turbine 52, to the intake passage 33. The high pressure EGR valve 63 adjusts an amount of recirculation exhaust gas passing through the high pressure EGR passage 62 toward the intake passage 33 (i.e., a recirculation amount of high pressure exhaust gas). The recirculated exhaust gas is supplied to the combustion chamber 21 together with the air compressed by the compressor 51.

The low pressure EGR device 70 includes a low pressure EGR pipe 71, a low pressure EGR valve 73, and an EGR cooler 74. The low pressure EGR pipe 71 branches from the exhaust pipe 42 downstream of the exhaust gas purification unit 44, and rejoins at the intake pipe 31 upstream of the compressor 51. The low pressure EGR valve 73 is disposed within a low pressure EGR passage 72 of the low pressure EGR pipe 71. Further, the EGR cooler 74 is disposed in the low pressure EGR passage 72 upstream of the low pressure EGR valve 73. The low pressure EGR passage 72 may recirculate a portion of low pressure exhaust gas, which is in the exhaust passage 43 downstream of both the turbine 52 and the exhaust gas purification unit 44, to the intake passage 33. Here, the EGR cooler 74 cools the exhaust gas passing through low pressure EGR passage 72. The low pressure EGR valve 73 adjusts an amount of recirculation exhaust gas pass through the low pressure EGR passage 72 toward the intake passage 33 (i.e., a recirculation amount of low pressure exhaust gas). The recirculated exhaust gas is compressed by the compressor 51 together with open air (fresh air) supplied through the air cleaner 34 from outside.

A controller 80 electronically controls the various electronically controlled components of the engine 10, i.e., including the throttle 36, the low pressure EGR valve 73, the high pressure EGR valve 63, as well as a fuel injection device and an ignition device (which are not illustrated). Specifically, the controller 80 electronically controls these various components to control the operating status of the engine 10.

Next, the controller 80 will be explained with reference to FIGS. 1 to 3.

Figure 2:
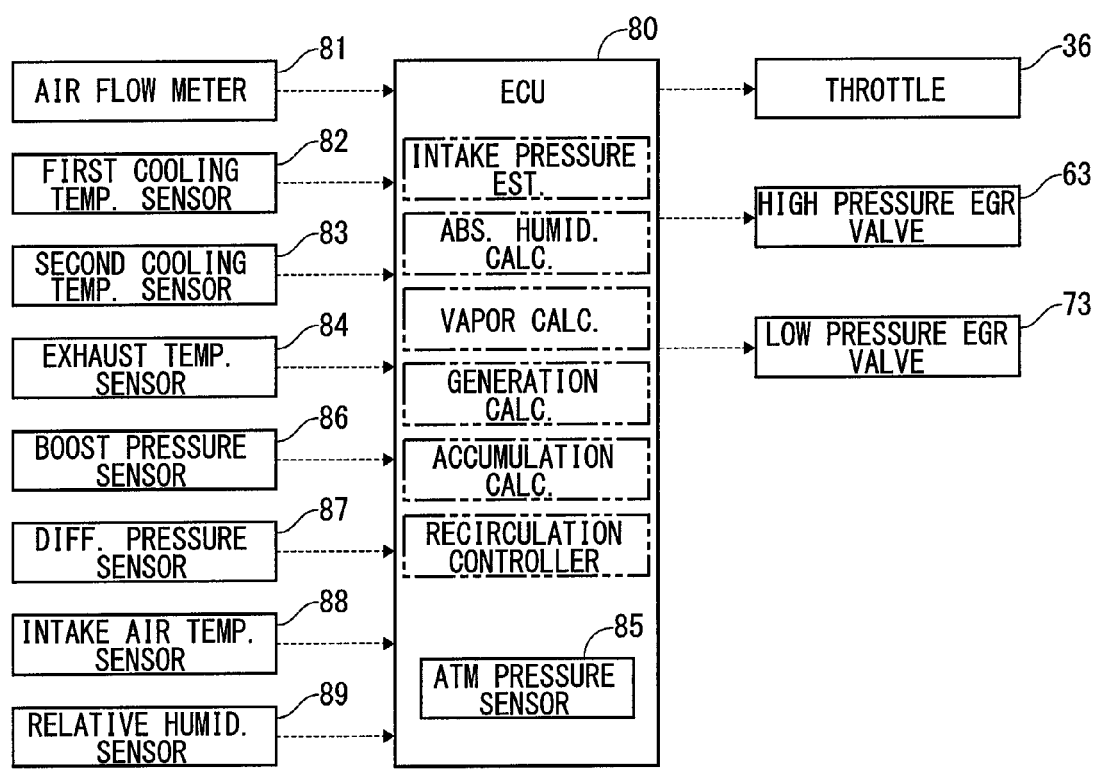
FIG. 2 is a block diagram showing a control system of the engine of FIG. 1.

The controller 80 shown in FIGS. 1 and 2 is microprocessor-based, and is electronically connected to the various components of the engine 10 and various vehicle-mounted sensors. These various sensors may include, for example, an airflow meter 81, a first cooling temperature sensor 82 attached to the EGR cooler 74, a second cooling temperature sensor 83 attached to the intercooler 35, an exhaust temperature sensor 84, an atmospheric pressure sensor 85, a boost pressure sensor 86, and a differential pressure sensor 87 that measures a pressure difference at the branch point and rejoin point of the low pressure EGR passage 72. Further sensors, not illustrated, include a crank angle sensor, an accelerator position sensor, a throttle position sensor, a water temperature sensor, a vehicle speed sensor, and the like. In the present embodiment, the airflow meter 81 provides an "air intake rate detector" and is equipped with an intake air temperature sensor 88 and a relative humidity sensor 89. Here, the intake air temperature sensor 88 provides an "intake air temperature detector", and the relative humidity sensor 89 provides a "relative humidity detector". Further, the atmospheric pressure sensor 85 detects an atmospheric pressure $P_{ATM}$.

The controller 80 performs a predetermined control process based on detection signals from the various sensors to control the components of the engine 10. Regarding the high pressure EGR device 60 and the low pressure EGR device 70, the controller 80 controls the recirculation amount of high pressure exhaust gas by controlling the high pressure EGR valve 63 to open and close, and by controlling the opening angle of the high pressure EGR valve 63. Further, the controller 80 controls the recirculation amount of low pressure exhaust gas by controlling the low pressure EGR valve 73 to open and close, and by controlling the opening angle of the low pressure EGR valve 73.

In the engine 10, fresh air and recirculated exhaust gas is compressed by the compressor 51 and then cooled by the intercooler 35. Further, recirculation exhaust gas passing through the low pressure EGR passage 72 is cooled by the EGR cooler 74. In this case, water vapor included in the supercharged air and the recirculation exhaust gas is cooled, and thus condensed water may be generated. As a result, there is a concern that this condensed water may corrode or damage various components. Specifically, condensed water generated from being cooled by the EGR cooler 74 may corrode the EGR cooler 74 and the low pressure EGR valve 73, and may damage the compressor 51. Further, condensed water generated from being cooled by the intercooler 35 may corrode the intercooler 35, and may damage the engine body 20 and cylinder parts.

Figure 3:
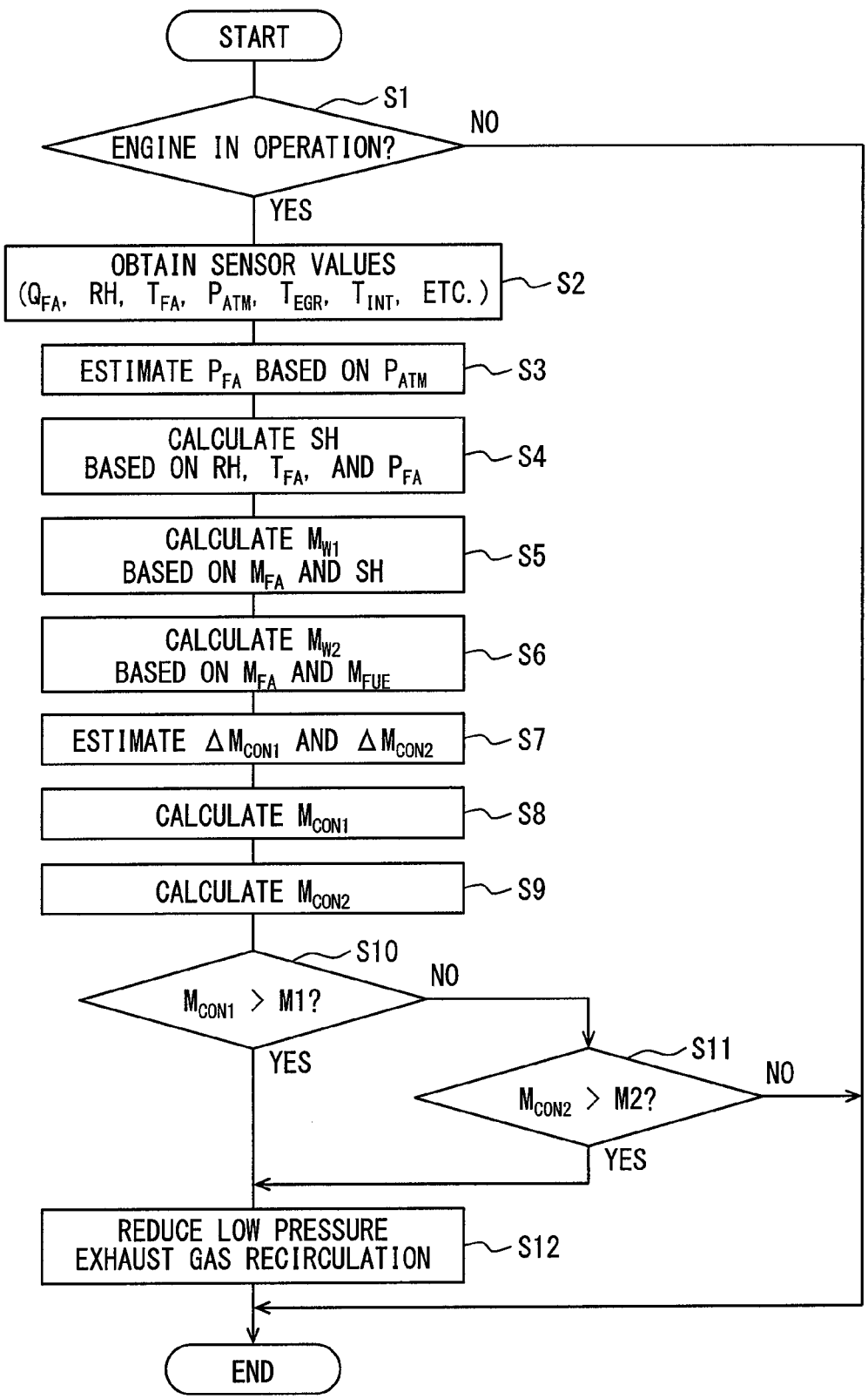
FIG. 3 is a flow chart showing a control process, which is performed by the controller of FIG. 1, for suppressing accumulation of condensed water.

In this regard, the controller 80 of the present embodiment performs the control process shown in FIG. 3 to estimate the amount of condensed water generated in each passage and calculates an accumulation amount of the condensed water. As such, the controller 80 controls the recirculation amount of low pressure exhaust gas based on this accumulation amount, and accumulation of condensed water may be suppressed. The series of steps in the control process explained below are repeatedly performed by the controller 80 once the controller 80 is in operation.

When the control process of FIG. 3 begins, first at step S1 it is determined whether the engine 10 is in operation based on a signal from an ignition switch or the like. If a positive determination is made at step S1 (S1: YES), then the control process proceeds to step S2. Conversely, if a negative determination is made at step S1 (S1: NO), then the control process exits the routine of FIG. 3.

At step S2, the detection signals of the various sensors are obtained. After steps S2, the control process proceeds to step S3.

At step S3, an intake air pressure $P_{FA}$ [Pa] is estimated. Specifically, a mass flow rate $M_{FA}$ [kg/s] of the intake air is calculated based on an air intake rate $Q_{FA}$ [m$^3$/s]. Next, a pressure loss $\Delta P_{CL}$ [in Pa] at the air cleaner 34 is estimated based on the mass flow rate $M_{FA}$. Then, the intake air pressure $P_{FA}$ is estimated on the atmospheric pressure $P_{ATM}$ and the pressure loss $\Delta P_{CL}$. After step S3, the control process continues to step S4.

At step S4, a specific humidity SH [g/kg] of the intake air is calculated based on a relative humidity RH [%] of the intake air, an intake air temperature $T_{FA}$ [° C.], and the intake air pressure $P_{FA}$.

Specifically, first, a volumetric humidity VH [g/m$^3$] is calculated from the relationship of equation (1). In equation (1), $e(T_{FA})$ is the saturation vapor pressure [Pa], and is obtained from a lookup table or the like based on the intake air temperature $T_{FA}$.

$$VH=18*RH*e(T_{FA})/(8.31447*[273.15+T_{FA}]) \quad (1)$$

Next, the specific humidity SH is calculated from the relationship of equation (2). In equation (2), $\rho_{DA}$ is a dry air density, and is obtained from equation (3).

$$SH=VH/\rho_{DA} \quad (2)$$

$$\rho_{DA}=P_{FA}/(287*[273.15+T_{FA}]) \quad (3)$$

After step S4, the control process continues to step S5.

At step S5, a water vapor amount in the intake air $M_{W1}$ [g/s] per unit time is calculated based on the specific humidity SH and the mass flow rate F. After step S5, the control process proceeds to step S6.

At step S6, a water vapor amount $M_{W2}$ [g/s] generated due to combustion of air and fuel in the combustion chamber 21 is calculated based on the mass flow rate $M_{FA}$ and a fuel injection rate $M_{FUE}$ [cm$^3$/s] of a fuel injection valve. After step S6, the control process continues to step S7.

At step S7, a generation amount $\Delta M_{CON1}$ and a generation amount $\Delta M_{CON2}$ are estimated based on the water vapor amount in the intake air $M_{W1}$, the water vapor amount generated due to combustion $M_{W2}$, a temperature $T_{EGR}$ of the EGR cooler 74 detected by the first cooling temperature sensor 82, and a temperature $T_{INT}$ of the intercooler 35 detected by the second cooling temperature sensor 83.

Here, the generation amount $\Delta M_{CON1}$ is the amount of condensed water which is generated from cooling by the EGR cooler 74. Specifically, the generation amount $\Delta M_{CON1}$ is an increase in the amount of water vapor (i.e., an accumulation amount) $M_{CON1}$ that is generated from cooling by the EGR cooler 74 and is accumulated in a first zone per calculation period. The first zone is a zone from the EGR cooler 74 to the low pressure EGR valve 73. Further, the generation amount $\Delta M_{CON2}$ is the amount of condensed water which is generated from being cooled by the intercooler 35. Specifically, the generation amount $\Delta M_{CON2}$ is an increase in the amount of water (i.e., an accumulation amount) $M_{CON1}$ that is generated from cooling by the intercooler 35 and is accumulated in a second zone per calculation period. The second zone is a zone from the intercooler 35 to the cylinder 23.

In the present embodiment, when estimating the generation amount $\Delta M_{CON1}$, a saturated water vapor amount $a(T_{EGR})$ [g/m$^3$] of the EGR cooler 74, which is obtained from the temperature $T_{EGR}$, is used. Further, when estimating the generation amount $\Delta M_{CON2}$, a saturated water vapor amount $a(T_{INT})$ [g/m$^3$] of the intercooler 35, which is obtained from the temperature $T_{INT}$, is used. The temperature $T_{EGR}$ and the temperature $T_{INT}$ correspond to a "cooling condition" of the present disclosure. After step S7, the control process proceeds to step S8.

At step S8, a current accumulation amount $M_{CON1}$ is calculated by adding a precious accumulation amount $M_{CON1}$ with a current generation amount $\Delta M_{CON1}$, and then subtracting the amount of condensed water carried away downstream by the recirculation exhaust gas. Here, the amount of condensed water carried away downstream by the recirculation gas is a quantity that varies based on, for example, the recirculation amount of low pressure exhaust gas, and is calculated from a lookup table or such. After step S8, the process proceeds to step S9.

At step S9, a current accumulation amount $M_{CON2}$ is calculated by adding a precious accumulation amount $M_{CON2}$ with a current generation amount $\Delta M_{CON2}$, and then subtracting the amount of condensed water carried away downstream by the intake air. Here, the amount of condensed water carried away downstream by the intake is a quantity that varies based on, for example, the air intake rate, and is calculated from a lookup table or such. After step S9, the process proceeds to step S10.

At step S10, it is determined whether the accumulation amount $M_{CON1}$ exceeds an acceptable limit M1. The acceptable limit M1 is an upper limit amount of condensed water where corrosion of the EGR cooler 74 and the low pressure EGR valve 73, as well as damage to the compressor 51, do not occur. For example, the acceptable limit M1 may be obtained from prior experimentation. If a positive determination is made at step S10 (S10: YES), then the control process proceeds to step S12. Conversely, if a negative determination is made at step S10 (S10: NO), then the control process proceeds to step S11.

At step S11, it is determined whether the accumulation amount $M_{CON2}$ exceeds an acceptable limit M2. The acceptable limit M2 is an upper limit amount of condensed water where corrosion of the intercooler 35, as well as damage to the engine body 20 and cylinder components, do not occur. For example, the acceptable limit M2 may be obtained from prior experimentation. If a positive determination is made at step S11 (S11: YES), then the control process proceeds to step S12. Conversely, if a negative determination is made at step S11 (S11: NO), then the control process exits the routine of FIG. 3.

At step S12, the recirculation amount of low pressure exhaust gas is decreased so as to lower the accumulation amount $M_{CON1}$ below the acceptable limit M1 and lower the accumulation amount $M_{CON2}$ below the acceptable limit M2.

The controller 80 functions as an "intake air pressure estimation unit" during step S3, a "specific humidity calculation unit" during step S4, a "first vapor amount calculation unit" during step S5, a "second vapor amount calculation unit" during step S6, a "generation amount estimation unit"

during step S7, and an "accumulation amount calculation unit" during steps S8 and S9. Further, during steps S10, S11, and S12, the controller 80 functions as a "recirculation controller" that controls a recirculation amount of the low pressure exhaust gas based on accumulation amounts $M_{CON1}$ and $M_{CON2}$ of condensed water. Each of the above elements may be realized by a CPU executing a program pre-stored on a ROM or such to perform software processing, or may be realized by a specialized electric circuit performing hardware processing.

As explained above, in the present embodiment, the controller 80 calculates the specific humidity SH of the intake air based on the relative humidity RH of the intake air, the intake air temperature $T_{FA}$, and the intake air pressure $P_{FA}$. The controller 80 then calculates the water vapor amount $M_{W1}$ in the intake air based on the mass flow rate $M_{FA}$ of the intake air, which is obtained from the air intake rate $Q_{FA}$, and the specific humidity SH of the intake air.

In this regard, by calculating the water vapor amount $M_{W1}$ based on information that directly represents the status of the intake air, this water vapor amount $M_{W1}$ is calculated with improved accuracy. As a result, the generation amounts $\Delta M_{CON1}$ and $\Delta M_{CON2}$ of condensed water may be accurately estimated. Therefore, the accumulation of condensed water may be suppressed while recirculating as much of the low pressure exhaust gas as possible, and thus fuel economy may be sufficiently improved.

Further, in the present embodiment, the controller 80 calculates the water vapor amount $M_{W2}$, which is generated due to combustion of air and fuel in the combustion chamber 21, based on the mass flow rate $M_{FA}$ of the intake air and the fuel injection rate $M_{FUE}$. Further, the controller 80 estimates the generation amounts $\Delta M_{CON1}$ and $\Delta M_{CON2}$ of condensed water based on the water vapor amount $M_{W1}$ of the intake air, the water vapor amount $M_{W2}$ generated due to combustion, the temperature $T_{EGR}$ of the EGR cooler 74, and the temperature $T_{INT}$ of the intercooler 35. Then, the controller 80 calculates the accumulation amounts $M_{CON1}$ and $M_{CON2}$ of condensed water based on the generation amounts $\Delta M_{CON1}$ and $\Delta M_{CON2}$. Finally, the controller 80 reduces the recirculation amount of the low pressure exhaust gas if the accumulation amount $M_{CON1}$ exceeds the acceptable limit M1 or if the accumulation amount $M_{CON2}$ exceeds the acceptable limit M2.

According to such a configuration, accumulation of condensed water may be suppressed while recirculating as much of the low pressure exhaust gas as possible. For example, if the acceptable limits M1 and M2 are set to extremely small values, the recirculation amount of the low pressure exhaust gas is maximized while ensuring that condensed water is not generated, and thus fuel economy may be further improved.

In addition, in the present embodiment, the controller 80 estimates the pressure loss $\Delta P_{CL}$ of the air cleaner 34 based on the mass flow rate $M_{FA}$ of the intake air. Further, the controller 80 estimates the intake air pressure $P_{FA}$ based on the atmospheric pressure $P_{ATM}$ and the pressure loss $\Delta P_{CL}$.

As a result, even without providing an intake air pressure sensor, the intake air pressure $P_{FA}$ may be estimated by an atmosphere pressure sensor which is already installed on the vehicle, and thus cost reduction may be achieved.

Further, in the present embodiment, the airflow meter 81 is equipped with the intake air temperature sensor 88 and the relative humidity sensor 89.

Accordingly, these sensors share a common housing, and cost reduction may be achieved by eliminating the number of harnesses for electrical connections and reducing manufacturing costs for installing the sensors.

(Other Embodiments)

In the first embodiment, a controller controls the recirculation amount of low pressure exhaust gas based on the accumulation amounts $M_{CON1}$ and $M_{CON2}$ of condensed water. However, in other embodiments of the present disclosure, a controller may control the recirculation amount of low pressure exhaust gas based on the generation amounts $\Delta M_{CON1}$ and $\Delta M_{CON2}$ of condensed water.

In the first embodiment, the engine 10 is equipped with a turbo-type supercharger 50. However, in other embodiments of the present disclosure, an engine 10 may be equipped with a mechanical type supercharger 50. In this case, a "resistive element that resists exhaust gas" may correspond to an exhaust gas purification unit.

In other embodiments of the present disclosure, the engine body is not limited to a reciprocating type, and may be other types.

In other embodiments of the present disclosure, the airflow meter 81 may be not equipped with either or both of an intake air temperature sensor and a relative humidity sensor.

In other embodiments of the present disclosure, an intake air pressure detector may be provided by a pressure sensor disposed in an intake passage.

In other embodiments of the present disclosure, the high pressure EGR device may be not provided.

The present disclosure is not limited to the above describe embodiments, and a variety of embodiments which do not depart from the gist of the present disclosure are contemplated.

The invention claimed is:

1. A controller for controlling an internal combustion engine which includes a supercharger, a low pressure exhaust gas recirculation (EGR) device, an air intake rate detector, an intake air temperature detector, and a relative humidity detector, where (i) the low pressure EGR device recirculates exhaust gas from an exhaust passage downstream of a resistive element to an intake passage upstream of a compressor of the supercharger, (ii) the resistive element resists the exhaust gas, (iii) the air intake rate detector detects an air intake rate, (iv) the intake air temperature detector detects an intake air temperature, and (v) the relative humidity detector detects a relative humidity of an intake air, the controller comprising:

a specific humidity calculation unit that calculates a specific humidity of the intake air based on the relative humidity, the intake air temperature, and an intake air pressure of the intake air; and a first vapor amount calculation unit that calculates a water vapor amount in the intake air based on a mass flow rate of the intake air and the specific humidity, the mass flow rate being obtained from the air intake rate;

a second vapor amount calculation unit;

a generation amount estimation unit; and a recirculation controller, wherein the internal combustion engine includes an EGR cooler and an intercooler, the EGR cooler cooling the exhaust gas recirculated by the low pressure EGR device, the intercooler cooling supercharged air which is heated due to compression by the compressor, the second vapor amount calculation unit calculates a water vapor amount in a combustion chamber of the internal combustion engine generated due to combustion in the combustion chamber, the generation amount estimation unit estimates a generation amount of condensed water in the internal combustion engine based on the water vapor amount in the intake air, the water vapor amount generated due to combustion, and a cooling condition of the EGR cooler and the intercooler, the cooling condition indicating an operating condition for the EGR cooler and the intercooler, and the recirculation controller controls a recirculation amount of a low pressure exhaust gas based on the generation amount or based on an accumulation amount of the condensed water obtained from the generation amount, the recirculation amount of the low pressure exhaust gas being an amount of the exhaust gas recirculated by the low pressure EGR device.

2. A system, comprising:
an internal combustion engine which includes
  a supercharger,
  a low pressure exhaust gas recirculation (EGR) device,
  an air intake rate detector,
  an intake air temperature detector, and
  a relative humidity detector, where
    (i) the low pressure EGR device recirculates exhaust gas from an exhaust passage downstream of a resistive element to an intake passage upstream of a compressor of the supercharger,
    (ii) the resistive element resists the exhaust gas, (iii) the air intake rate detector detects an air intake rate,
    (iv) the intake air temperature detector detects an intake air temperature, and
    (v) the relative humidity detector detects a relative humidity of an intake air; and
a controller which includes
  a specific humidity calculation unit that calculates a specific humidity of the intake air based on the relative humidity, the intake air temperature, and an intake air pressure of the intake air;
  a first vapor amount calculation unit that calculates a water vapor amount in the intake air based on a mass flow rate of the intake air and the specific humidity, the mass flow rate being obtained from the air intake rate;
  a second vapor amount calculation unit;
  a generation amount estimation unit; and
  a recirculation controller, wherein the internal combustion engine cooler includes an EGR cooler and an intercooler, the EGR cooler cooling the exhaust gas recirculated by the low pressure EGR device, the intercooler cooling supercharged air which is heated due to compression by the compressor, the second vapor amount calculation unit calculates a water vapor amount in a combustion chamber of the internal combustion engine generated due to combustion in the combustion chamber, the generation amount estimation unit estimates a generation amount of condensed water in the internal combustion engine based on the water vapor amount in the intake air, the water vapor amount generated due to combustion, and a cooling condition of the EGR cooler and the intercooler, the cooling condition indicating an operating condition for the EGR cooler and the intercooler, and the recirculation controller controls a recirculation amount of a low pressure exhaust gas based on the generation amount or based on an accumulation amount of the condensed water obtained from the generation amount, the recirculation amount of the low pressure exhaust gas being an amount of the exhaust gas recirculated by the low pressure EGR device.

3. The system of claim 2, wherein
the controller further includes an intake air pressure estimation unit, and
the intake air pressure estimation unit
  obtains an atmospheric pressure from an atmospheric pressure sensor included in the internal combustion engine,
  estimates a pressure loss at an air cleaner based on the mass flow rate of the intake air obtained from the air intake rate, the air cleaner being disposed in the intake passage of the internal combustion engine and upstream of the compressor of the supercharger, the pressure loss being estimated as a pressure difference across the air cleaner, and
  estimates the intake air pressure based on the atmospheric pressure and the pressure loss.

* * * * *